(12) United States Patent
Murphy (10) Patent No.: US 7,131,620 B2
(45) Date of Patent: Nov. 7, 2006

(54) PORTABLE TRAVEL GRIP

(75) Inventor: Joy Viren Murphy, Rock Island, IL (US)

(73) Assignee: Joy V. Murphy, Rock Island, IL (US)

( * ) Notice: Subject to any disclaimer, the term of this patent is extended or adjusted under 35 U.S.C. 154(b) by 0 days.

(21) Appl. No.: 10/667,716

(22) Filed: Sep. 22, 2003

(65) Prior Publication Data

US 2005/0061944 A1  Mar. 24, 2005

(51) Int. Cl.
*B60R 9/00* (2006.01)
*A47B 97/00* (2006.01)

(52) U.S. Cl. .................. 248/505; 248/500; 224/329; 182/196

(58) Field of Classification Search ............ 248/505, 248/503, 500; 224/318, 329, 563; 296/37.7; 410/101, 97; 182/196, 198, 199
See application file for complete search history.

(56) References Cited

U.S. PATENT DOCUMENTS

| | | | | | |
|---|---|---|---|---|---|
| 192,403 | A | * | 6/1877 | Allen | 182/198 |
| 486,670 | A | * | 1/1892 | Fler | 294/152 |
| 749,558 | A | * | 1/1904 | Hirsch | 182/199 |
| 2,927,329 | A | * | 3/1960 | Johannis | 5/662 |
| 2,985,254 | A | * | 5/1961 | Marryatt | 182/198 |
| 3,128,843 | A | * | 4/1964 | Anagnostou | 182/198 |
| 3,741,340 | A | * | 6/1973 | Andrews | 182/196 |
| 4,108,342 | A | * | 8/1978 | Riva | 224/484 |
| 4,121,825 | A | * | 10/1978 | Hult | 482/140 |
| 4,253,594 | A | * | 3/1981 | Parks | 224/318 |
| 4,288,188 | A | * | 9/1981 | Smith | 410/97 |
| 4,537,436 | A | * | 8/1985 | Pfortmiller | 294/150 |
| 4,655,376 | A | * | 4/1987 | Darling | 224/324 |
| 4,696,504 | A | * | 9/1987 | Roberts, Jr. | 294/148 |
| 4,735,320 | A | * | 4/1988 | Hoss | 206/583 |
| 4,770,373 | A | * | 9/1988 | Salo | 244/137.4 |
| 5,004,292 | A | * | 4/1991 | Horne | 298/153 |
| 5,163,889 | A | * | 11/1992 | Kaaua | 482/140 |
| D340,216 | S | * | 10/1993 | Moores | D3/315 |
| 5,335,836 | A | * | 8/1994 | Waddell | 224/329 |
| 5,503,451 | A | * | 4/1996 | Thomas | 296/153 |
| 5,556,062 | A | * | 9/1996 | Ellett et al. | 248/55 |
| 5,730,346 | A | * | 3/1998 | Adams et al. | 224/556 |
| 6,224,024 | B1 | * | 5/2001 | Fritz | 248/55 |
| 6,651,776 | B1 | * | 11/2003 | Montecer, Jr. | 182/196 |

* cited by examiner

*Primary Examiner*—Anita M. King
(74) *Attorney, Agent, or Firm*—Law Office of Jay R. Hamilton, PLC.

(57) ABSTRACT

A portable assistive device adaptable to most vehicles with hinged doors. The invention as described allows for anchor unit to rest outside vehicle and to be positioned for use with the door open. The apparatus user can then shut the door without holding the invention in place. As described, the anchor unit is connected to the grip unit with flexible connector straps and does not interfere with operation of the window and does not require the disconnection of the flexible connector straps to transfer the device between vehicles.

4 Claims, 11 Drawing Sheets

PORTABLE TRAVEL GRIP

CROSS REFERENCE TO RELATED APPLICATIONS (Not applicable)

STATEMENT REGARDING FEDERALLY SPONSORED RESEARCH OR DEVELOPMENT

No federal funds were used to develop or create the invention disclosed and described in the patent application.

REFERENCE TO SEQUENCE LISTING, A TABLE, OR A COMPUTER PROGRAM LISTING COMPACT DISK APPENDIX (Not Applicable)

BACKGROUND OF THE INVENTION

This invention relates to assistive devices and more particularly to a portable device useful for increasing the comfort and stability of a passenger in an automobile.

Figure 1:
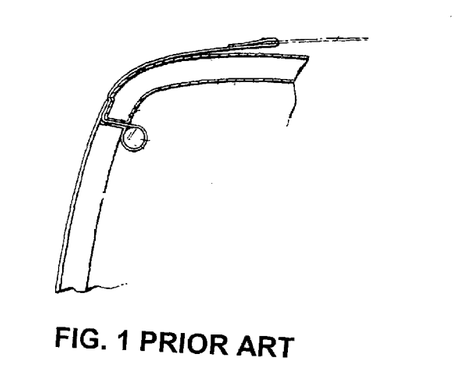
FIG. 1 provides a perspective view of the prior art as found in U.S. Pat. No. 4,253,594.
Figure 2:
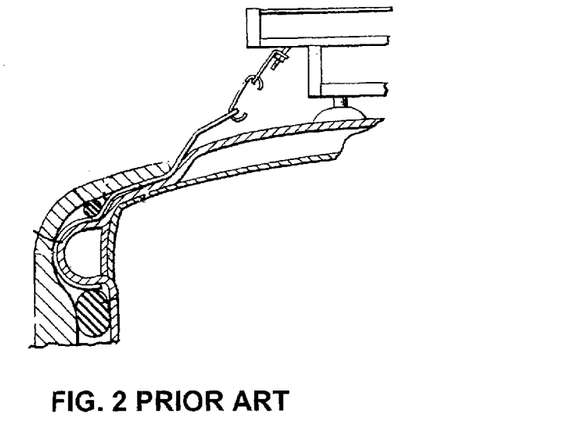
FIG. 2 provides a perspective view of the prior art as found in U.S. Pat. No. 5,335,836.

There are many different types of portable assistive devices developed for use with an automobile or other vehicle having a passenger cabin. Certain of these devices were developed to increase the storage or moving capacity of a vehicle. For example, U.S. Pat. No. 4,253,594 issued to Parks teaches an anchor strap system for use in securing an object to the outside of a car. (See FIG. 1) This invention takes advantage of the automobile door frame and locates the anchor portion of the strap system inside the vehicle. The anchor end of the device described is held in place by and between the upper portion of the door and the door frame of the vehicle. U.S. Pat. No. 5,335,836 issued to Waddell describes another system useful for attaching objects to the roof of the car. (See FIG. 2) As described, the anchor portion of Waddell's invention sits entirely between the upper section of the vehicles door and the frame of the vehicle. Both systems do not teach an apparatus useful in the support of someone inside the vehicle. Furthermore, the system taught by Parks is limited because the components must fit into the door frame of the vehicle. Given the wide array of vehicles available on the market today, this anchoring system is unlikely to meet any sort "one size fits all" type requirement necessary for maximum utility.

Figure 3:
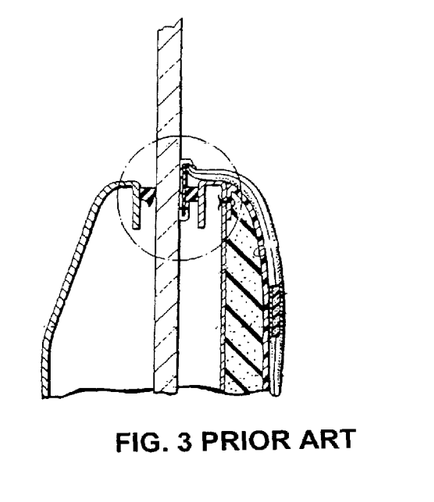
FIG. 3 provides a perspective view of the prior art as found in U.S. Pat. No. 5,004,292.
Figure 4:
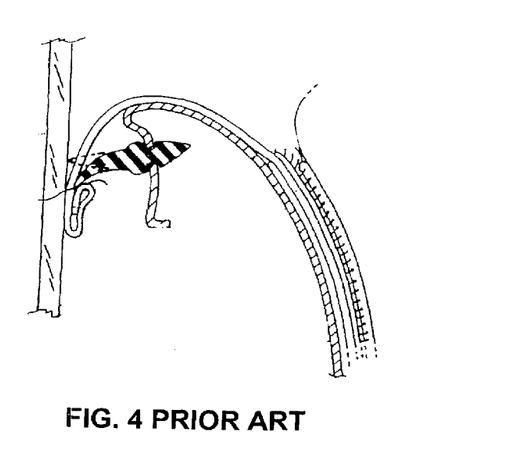
FIG. 4 provides a perspective view of the prior art as found in U.S. Pat. No. 5,503,451.

Another type of assistive device for use in a vehicle is as shown in U.S. Pat. No. 5,503,451 issued to Thomas and U.S. Pat. No. 5,004,292 issued to Horne. (See FIGS. 3 and 4, respectively) Both patents describe apparatuses that may be used to provide arm rests for passengers inside the vehicle and adjacent the vehicle door. Both patents also describe systems using anchoring systems that fasten between the door frame and the window frame within the door frame. The problem associated with these systems center around the obstruction typically caused by the way the described apparatuses are anchored to the automobile. As described the devices use similar variations of a narrow hook-like feature to connect the device to the window frame and anchor the device between the window of the door and inner body compartments. This method of fixation to the vehicle interior is likely to mar the interior of the vehicle. Additionally, when fixed between the window frame and inner body compartments, it becomes semi-permanent reducing the users ability to move the device between vehicles.

Figure 5:
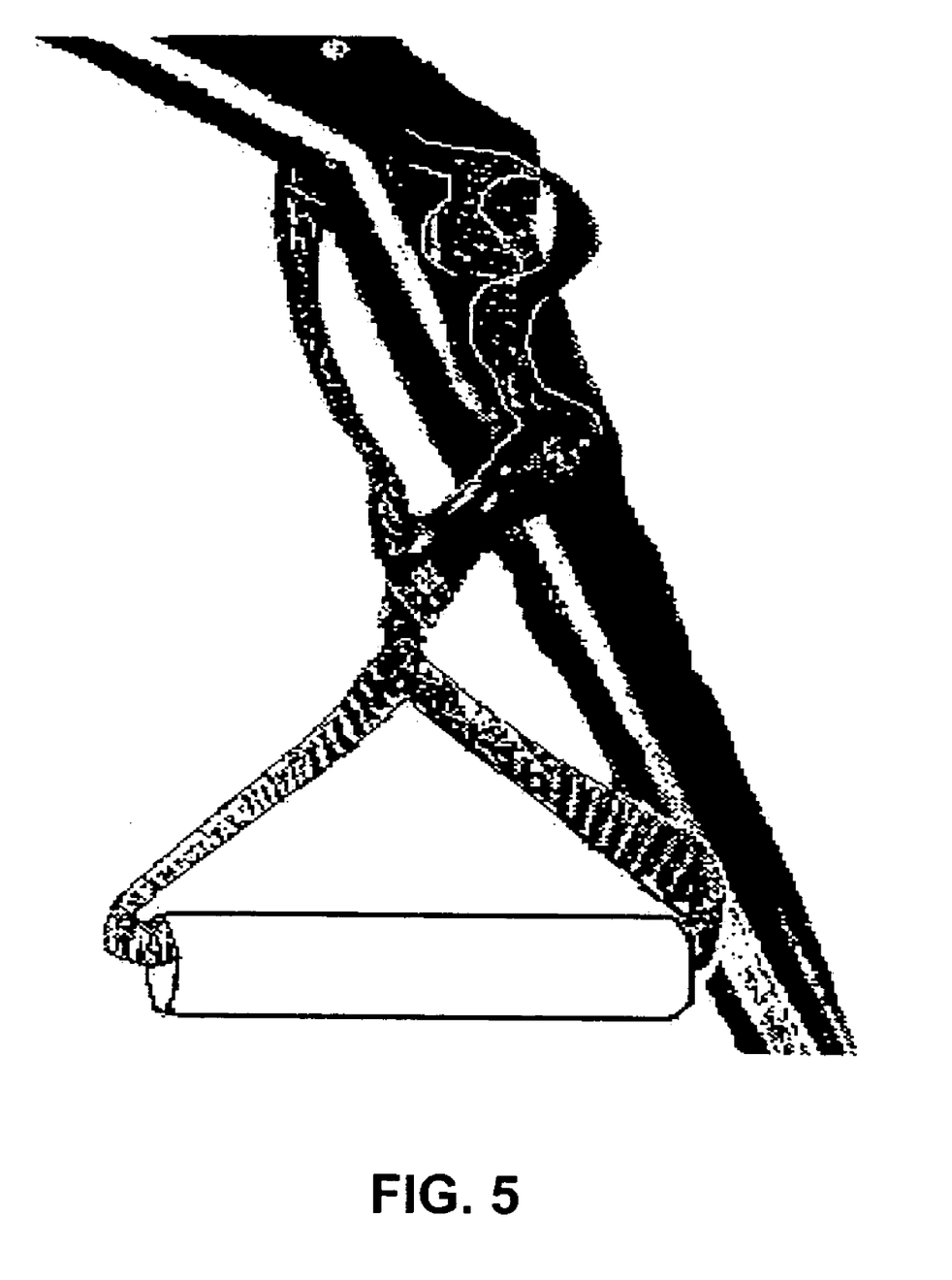
FIG. 5 provides a perspective view of a device available in the market and known as the "Car Caddy".

A hybrid passenger support system marketed as a "Car Caddy" also bears consideration and is shown in FIG. 5. This device supports a user as the user exits the vehicle. The anchor system for this device is inserted into and looped between the window and the door frame of the automobile. The disadvantages of this system are that it's anchoring system loops around the window frame thus obstructing the user's use of the window.

BRIEF SUMMARY OF THE INVENTION

It is the primary object of the present invention to provide a lightweight portable apparatus to be used by automobile passengers for personal support. It is another objective of the following invention for the lightweight portable apparatus to be compatible with most vehicles on the market today. It is another objective of the present invention for it to balance itself upon the upper portion of the open door frame so that the user does not have to hold it in place during initial placement upon the vehicle door frame. It is another object of the invention for the invention to also function as a utility hanger to increase the available hanging space within a vehicle.

According to the present invention there is an anchor unit to be located outside of the vehicle. The anchor unit is connected to at least one flexible connector strap which fits into the joint between the vehicle door frame and the vehicle door. At the opposite end the flexible connector strap is wrapped around the body of a grip unit at least once. A non-removable fastener is then inserted through strap and into the body of the anchor unit. The grip unit end of the flexible connector strap is first connected to itself and then fastened to the grip unit body with a non-removable fastener. Both the grip and anchor units should be made of strong, lightweight materials that do not mar the finish of the vehicle while providing support to the user when in use. Additionally, the materials chosen can be used both inside and outside and have weather resistant properties. The grip unit may be covered with materials such as neoprene rubber, foam or matting to improve unit comfort.

In the preferred embodiment, two flexible connector straps are used to increase the weight bearing properties of the apparatus. The connection points are towards the outer ends of the anchor and grip units, respectively. Placing the connection points towards the outer ends of the units increases the area available for the user's hand and improves user comfort. Additionally, in this configuration the load placed on the device by the passenger is better balanced between the connector straps. The fastener connection points at the anchor end are in a plane perpendicular to the hanging flexible connector straps. The flexible connector straps are wrapped around the anchor unit at least one time. At the flexible connector strap overlap a non-removable fastener is inserted into the anchor unit. Insertion at this point improves the strength of the connection to the anchor unit 5 while maintaining the flexibility allowed by the connector straps 15. Perpendicular placement increases the strength of the connection point between the connector straps and the anchor unit. The wrap of the flexible connector strap increases the tendency of the anchor unit to roll over the outside of the vehicle door frame further easing initial placement of the invention in an open vehicle door. Additionally, perpendicular placement allows the anchor unit to roll over the door frame and balance in place so the vehicle door can be closed by the user.

This feature allows the user to initially place the invention in the open vehicle door frame using only one hand which can be critical for those with limited physical capabilities. At the opposite end, the flexible connector straps are looped around the grip unit and fastened back to the flexible connector strap. The loop configuration cradles the grip unit and allows the grip unit to hang naturally without binding and ensures a comfortable but stable swinging of the unit when in use. Insertion of non-removable fasteners at the grip end of the flexible connector straps improves the load bearing ability of the invention and further ensures the grip unit does not slip out of the loops. The non-removable fasteners are best inserted on the bottom side of the grip unit to avoid interfering with the user's grip and to transfer the load from the fasteners to the flexible connector straps.

BRIEF DESCRIPTION OF THE DRAWINGS

For a better understanding of the present invention, reference is to be made to the accompanying drawings. It is to be understood that the present invention is not limited to the precise arrangement shown in the drawings.

DETAILED DESCRIPTION OF THE INVENTION

LISTING OF THE ELEMENTS

| Description | Number |
|---|---|
| Anchor unit | 5 |
| Grip unit | 10 |
| Flexible connector straps | 15 |
| Flexible connector strap overlap | 16 |
| Non-removable fastener (anchor unit) | 17 |
| Flexible connector strap self-fastened area | 18 |
| Non-removable fastener (grip unit) | 19 |
| Vehicle door frame | 20 |
| Vehicle door | 21 |

-continued

LISTING OF THE ELEMENTS

| Description | Number |
|---|---|
| Vehicle door frame ridge | 22 |
| Vehicle window | 25 |
| Vehicle roof | 30 |

Figure 6:
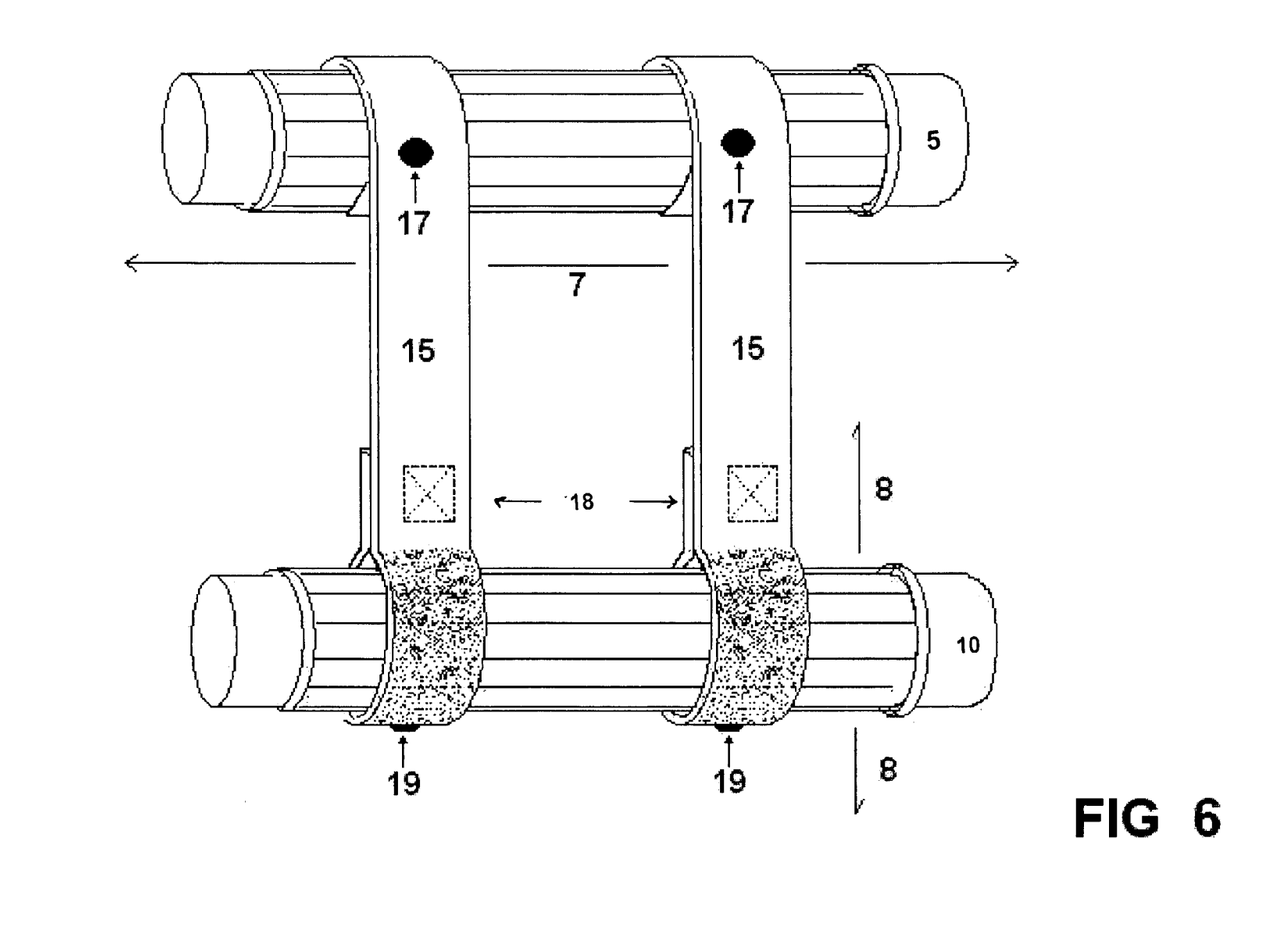
FIG. 6 is a perspective view of the present invention.
Figure 7:
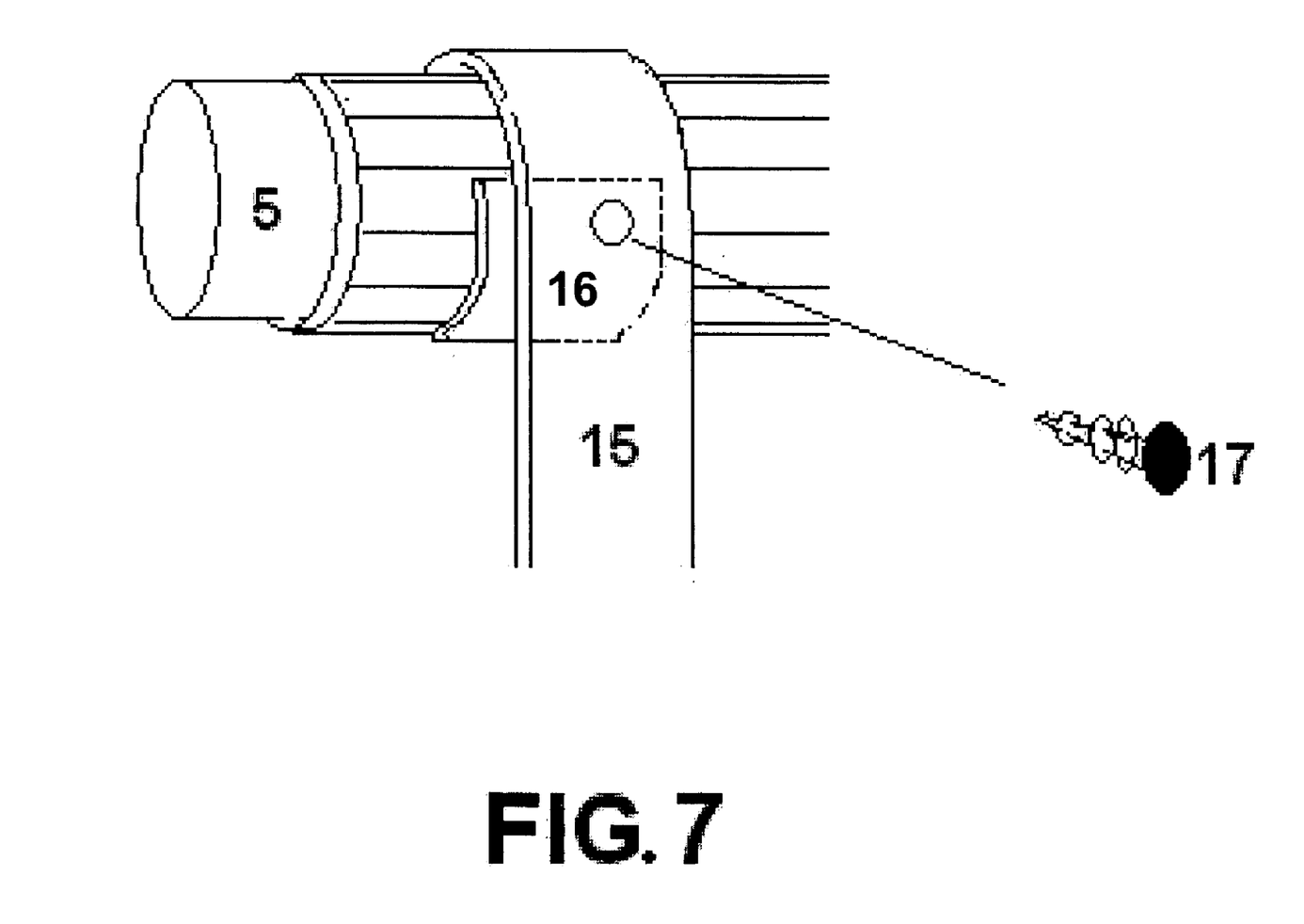
FIG. 7 is an exploded view of the flexible connector strap fastened to the anchor unit.

Reference is first made to FIG. 6, which depicts how the preferred embodiment of the present invention works. As shown in FIG. 6, the invention is a portable support apparatus for use inside a vehicle. It is compromised of an anchor unit 5 having a generally cylindrical shape. As built the anchor unit 5 has a length of seven (7) to eight (8) inches and a diameter of approximately one (1) inch. The anchor unit 5 is designed to rest both outside the vehicle during use and upon the upper horizontal portion of the vehicle door frame 20 in close proximity to the vehicle door frame ridge 22. In the preferred embodiment, the anchor unit 5 is connected to the grip unit 10 by two (2) weight bearing flexible connector straps 15. To increase portability and reduce the overall bulkiness of the invention, the flexible connector straps in the preferred embodiment have a generally flat rectangular shape. As described and shown in FIG. 7, the flexible connector straps are wrapped around the anchor unit at least one time. At the flexible connector strap overlap 16, a non-removable fastener 17 is inserted into the anchor unit. Insertion at this point improves the strength of the connection to the anchor unit 5 while maintaining the flexibility allowed by the connector straps 15.

Figure 8:
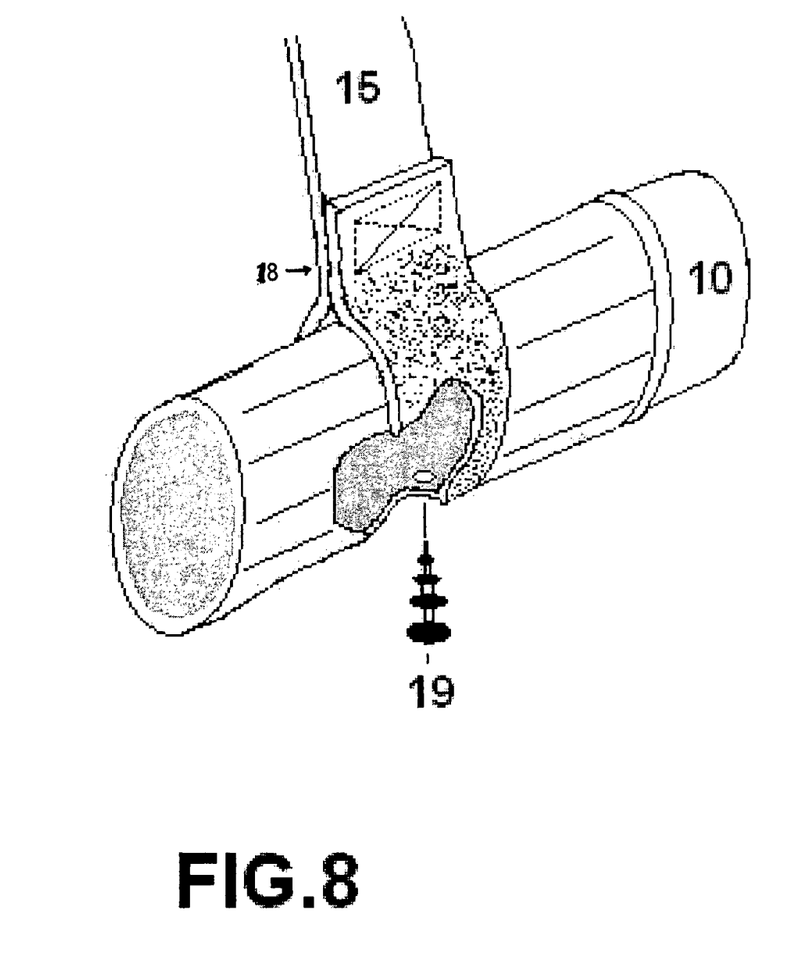
FIG. 8 is a side cut-a-way view of the flexible connector strap fastened to the grip unit.
Figure 9:
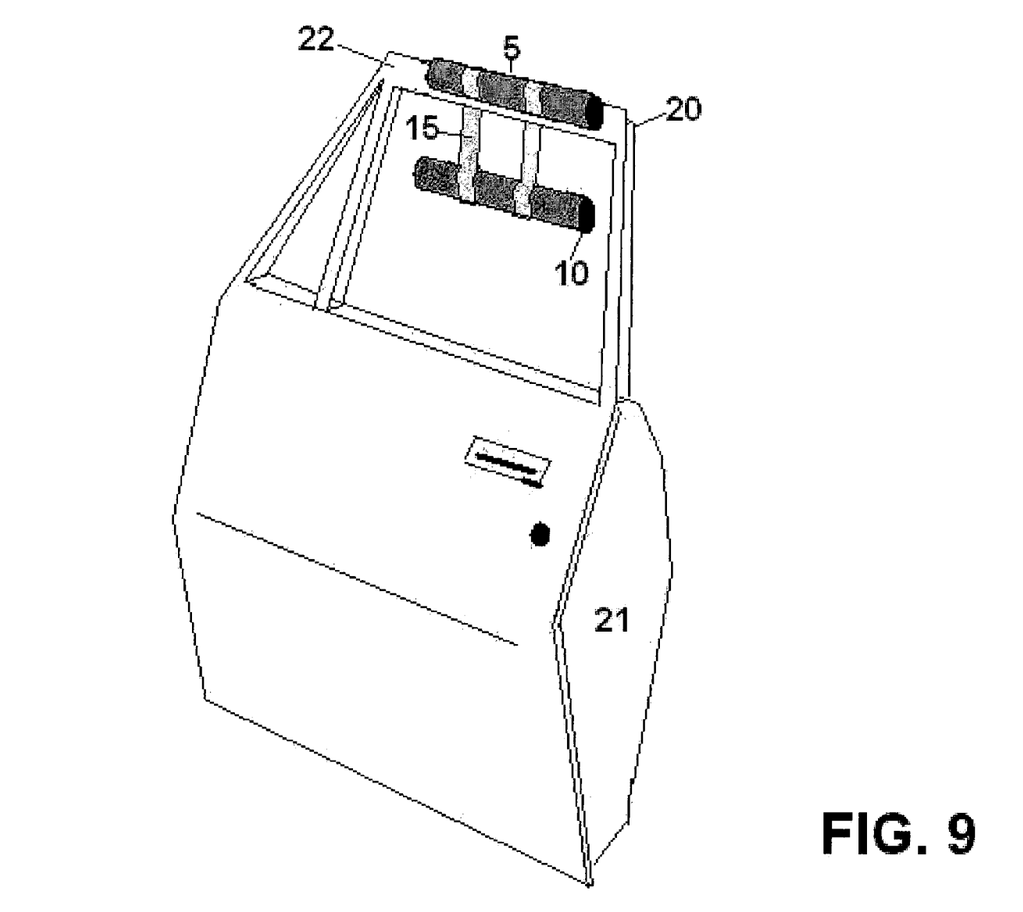
FIG. 9 is a perspective view of the present invention placed in a vehicle door.
Figure 10:
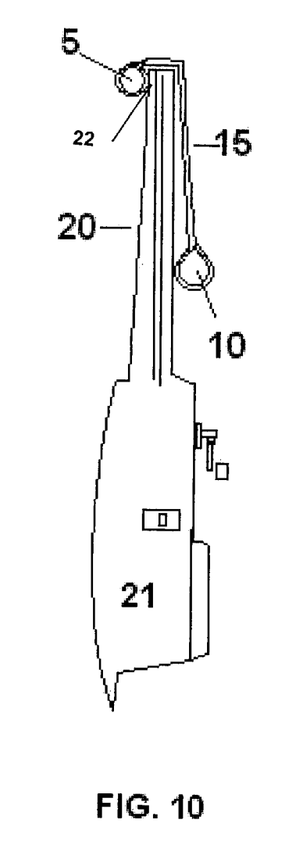
FIG. 10 is a right side view of the present invention placed in an open vehicle door.
Figure 11:
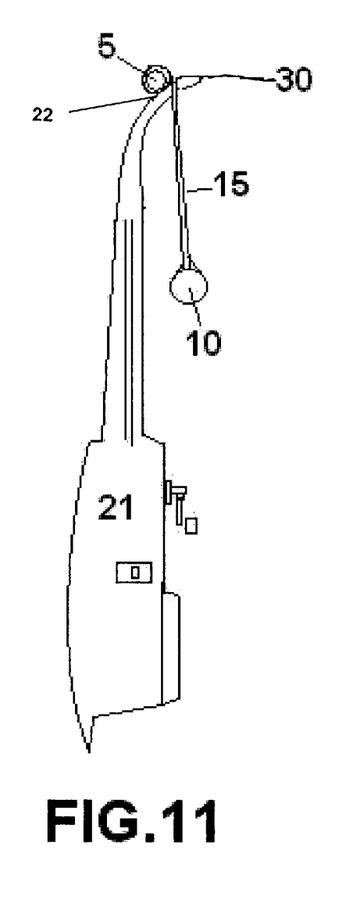
FIG. 11 is a right side view of the present invention as placed in a closed vehicle door.

Reference is next made to FIG. 8 which highlights the point connection of the flexible connector straps 15 to the grip unit 10 through a cut-a-way right side view. As built the grip unit 10 also has a length of seven (7) to eight (8) inches and a diameter of approximately one (1) inch. The flexible connector strap self-fastened area 18 allows the flexible connector strap 15 to cradle the grip unit 15 transferring part of the load while in use to the self-fastened area 18 and away from the non-removable fastener 19 inserted into the grip unit 10. This cradle or loop type configuration increases the strength of the unit while allowing the non-removable fasteners 19 to be placed in an unobtrusive manner increasing available space for the user's hand and aiding in comfort. FIG. 9 provides a perspective view of the present invention as it is placed in a vehicle door 21. The anchor unit 5 is allowed to hang outside and over the door frame 20 while the flexible connector straps 15 rest back inside and upon the door frame ridge 22. The weight of the anchor unit 5 hanging over the crest of the door frame ridge 22 allows the invention to rest in this position while the vehicle door 30 is closed thus, freeing the passenger hands to remain safely inside the vehicle. FIG. 10 is a right side view of the present invention placed in an open vehicle door 21. FIG. 11 is a right side view of the present invention as placed in a closed vehicle door 21. When closed the relatively small space between the vehicle door frame ridge 22 and the vehicle roof 30 locks the anchor unit 5 and flexible connector straps 15 into place inside the vehicle.

Figure 12:
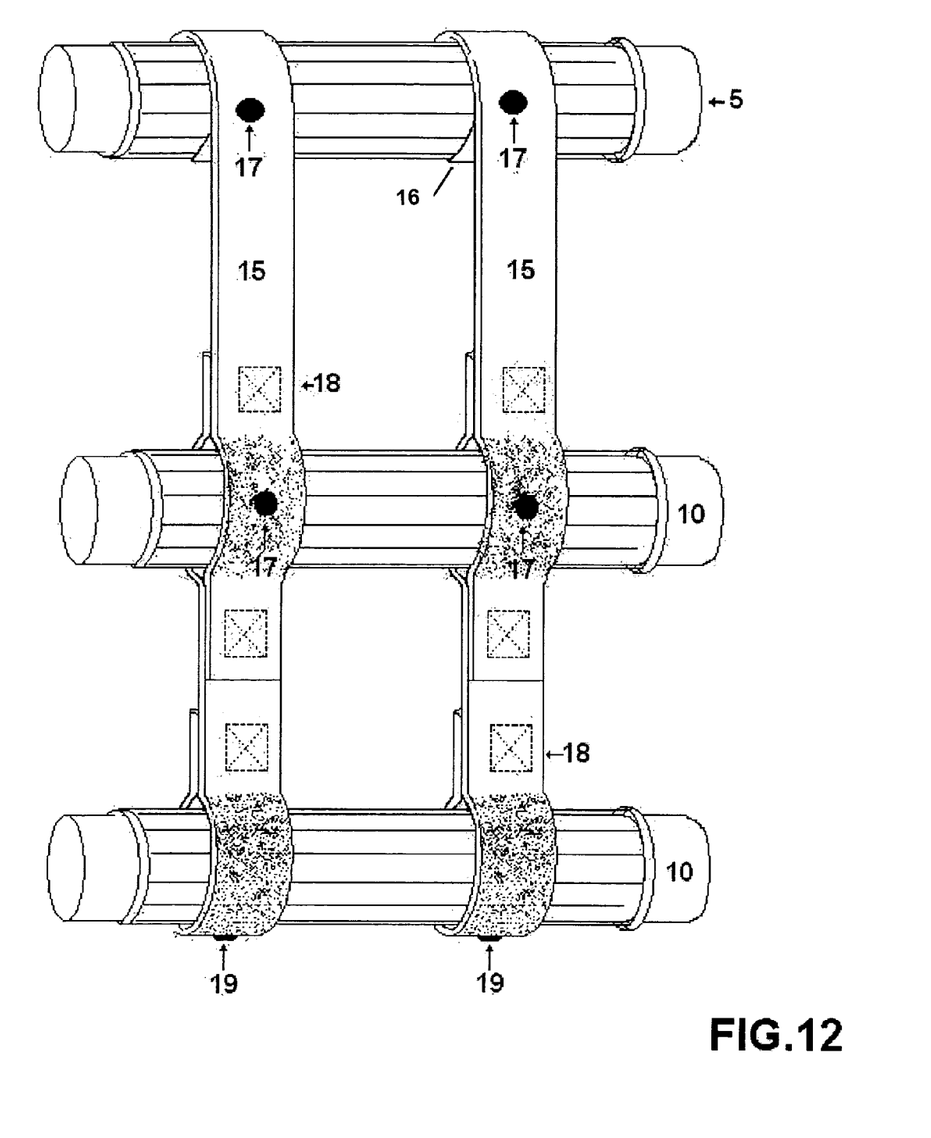
FIG. 12 is a perspective view of the present invention as embodied with multiple grip units.
Figure 13:
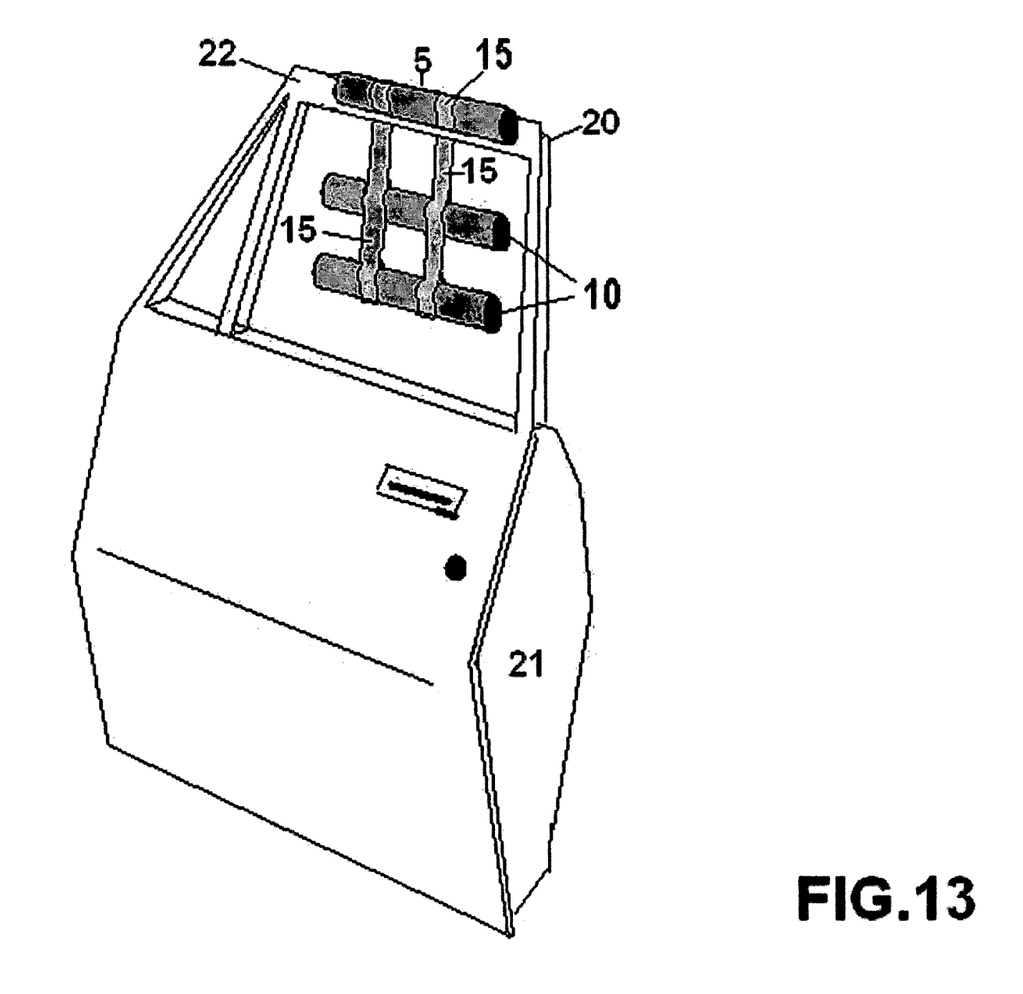
FIG. 13 is a perspective view of the present invention as embodied with multiple grip units as placed in a vehicle door.
Figure 14:
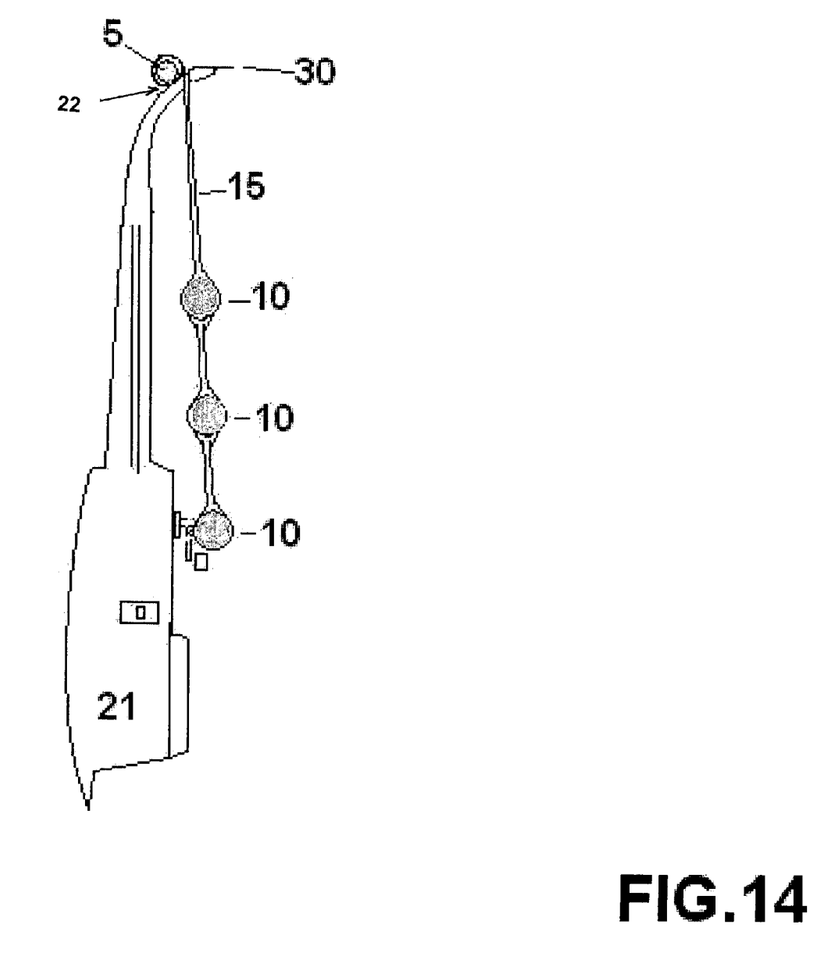
FIG. 14 is a right side view of the present invention as embodied with multiple grip units as placed in a closed vehicle door.

Another embodiment of the invention is shown in FIG. 12. As shown, multiple grip units 10 are used. The multiple grip units 10 essentially allow the user to vary the height at which they place their hand. Another potential way in which the user may take advantage of the multiple grip units 10 is as a ladder. For the severely disabled or those with limited physical strength, the multiple grip units 10 may allow them to "walk" their hand up the grip units 10 to their preferred elevation. FIG. 13 is a perspective view of the multiple grip units 10 as placed in a vehicle door 21. FIG. 14 is a right side view of the present invention as embodied with multiple grip units 10 with the vehicle door 21 closed. As shown in the FIG. 14, the addition of multiple grip units 10 does not interfere with the anchoring action achieved by the insertion of the anchor unit 10 outside the vehicle and the flexible connector straps 15 inside the vehicle between the door frame ridge 22 and vehicle roof 30.

The present invention may be embodied in other specific forms without departing from the essential attributes thereof. Reference should be made to the appending claims rather than the foregoing specification as indicating the scope of the invention.

The invention claimed is:

1. A portable support apparatus for use inside a vehicle having a door frame, comprising:
   a. an anchor unit having a diameter and two opposing ends;
   b. a set of two flexible connector straps wherein each connector strap has two ends and wherein a first end of said flexible connector strap circumscribes the diameter of said anchor unit and said flexible connector strap is attached to said anchor unit, said flexible connector straps are generally rectangular in shape and are positionable to lay substantially flat against the upper portion of a vehicle door frame;
   c. a grip unit having two opposing ends; and,
   d. a fastener attaching said grip unit to said second end of said flexible connector strap, said anchor unit positionable externally of said vehicle door frame to rest upon the upper outside portion of said door frame and vehicle roof when closed, while said grip unit is positionable inside said vehicle door frame.

2. The apparatus according to claim 1, wherein each connector strap is attached to the anchor end at the overlap of the connector strap with at least one non-removable fastener.

3. The apparatus according to claim 2, wherein each connector strap is attached both to itself and attached to the grip unit.

4. The apparatus according to claim 3, wherein the fasteners used to attach the grip unit to said flexible connector straps are in a plane perpendicular to the plane the anchor unit fasteners are in.

* * * * *